United States Patent
Stolyarov et al.

(10) Patent No.: US 8,442,078 B1
(45) Date of Patent: May 14, 2013

(54) MICROFLUIDIC RADIAL FIBER LASER UTILIZING AN EXTERNAL POLARIZER TO MODULATE ITS AZIMUTHAL INTENSITY DISTRIBUTION

(75) Inventors: Alexander Stolyarov, Somerville, MA (US); Lei Wei, Cambridge, MA (US); Ofer Shapira, Cambridge, MA (US); Fabien Sorin, Paris (FR); Yoel Fink, Brookline, MA (US); John D. Joannopoulos, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/323,059

(22) Filed: Dec. 12, 2011

(51) Int. Cl.
*H01S 3/30* (2006.01)

(52) U.S. Cl.
USPC .................. 372/6; 372/51; 372/52; 372/53

(58) Field of Classification Search ........................ 372/6
See application file for complete search history.

(56) References Cited

U.S. PATENT DOCUMENTS

2003/0231279 A1* 12/2003 Wessel et al. ................ 349/198
2007/0280304 A1* 12/2007 Deile et al. ........................ 372/6

OTHER PUBLICATIONS

McCall, S. L.; Levi, A. F. J.; Slusher, R. E., Pearton, S. J. & Logan, R.A. Whispering-gallery mode microdisk lasers, Appl. Phys. Lett. 60, 289-291 (1992).
Moon H.-J. Chough, Y.-T. & Kyungon A. Cylindrical microcavity laser based on the evanescent-wave-coupled gain. Phys. Rev. Lett. 85, 3161-3164 (2002).
Kawabe, Y. et al. Whispering-gallery-mode microring laser using a conjugated polymer. Appl. Phys. Lett. 72, 141-143 (1998).
Knight, J. C., Driver, H. S. T., Hutcheon, R. J. & Robertson, G. N. Core-resonance capillary-fiber whispering-gallery-mode-laser. Opt. Lett. 17, 1280-1282 (1992).
Malko, A. V. et al. From amplified spontaneous emission to microring lasing using nanocrystal quantum dot solids. Appl. Phys. Lett. 81, 1303-1305 (2002).
Kazes, M., Lewis, D. Y.,. Ebenstein, Y., Mokari, T. & Banin, U. Lasing from Semiconductor Quantum Rods in a Cylindrical Microavity. Adv. Mater. 14, 317-321 (2002).
O'Connor, B., Pipe, K. P. & Shetein, M. Fiber based organic photovoltaic devices. Appl. Phys. Lett. 92, 193306 (2008).
Fokine, M. et al. Integrated fiber Mach-Zehnder interferometer for electro-optic switching. Opt. Lett. 27, 1643-1645 (1007).
Lee, M.R. et al. Solar power wires based on organic photovoltaic materials. Science 324, 232-235 (2009).
Shapira, O. et al. Surface-emitting fiber lasers. Opt. Express 14, 3929-3935 (2006).
Danto, S. et al. Fiber Field-Effect Device Via In Situ Channel Crystallization. Adv. Mater. 22, 4162-4166 (2010).

(Continued)

*Primary Examiner* — Jessica Stultz
*Assistant Examiner* — Brian Riely
(74) *Attorney, Agent, or Firm* — Sam Pasternack; MIT Technology Licensing office

(57) ABSTRACT

The laser includes an optical fiber including a cavity containing a microfluidic gain medium bounded by a composite structure of alternating layers of high and low index materials forming an axially invariant, rotationally symmetric photonic bandgap cavity. The optical fiber also includes at least one microfluidic channel containing liquid crystal modulators in the fiber cladding extending in an axial direction and further includes a pair of electrodes flanking the microfluidic channel. An electrical potential across the pair of electrodes will rotate the liquid crystal molecules to rotate the linearly polarized state of light emitted from the cavity. An external linear polarizer is disposed around the fiber to modulate azimuthal laser intensity distribution.

8 Claims, 7 Drawing Sheets

OTHER PUBLICATIONS

Orf, N.D. et al. Fiber draw synthesis. PNAS 108, 4743-4747 (2011).

Egusa, S. et al. Multimaterial Piezoelectric fibres. Nature Materials 9, 643-648 (2010).

Abouraddy, A. F. et al. Towards multimaterial multifunctional fibres that see, hear, sense and communicate. Nature Materials 6, 336-647 (2007).

Sorin, F. et al. Exploiting Collective Effects of Multiple Optoelectronic Devices Integrated in a Single Fiber. Nano Lett. 9, 2630-2635 (2009).

Dolmans, D. E., Fukumura, D. & Jain, R. K. Photodynamic therapy for cancer. Nature Rev. Cancer 3, 380-387 (2003).

Bgraginsky, V.B., Gorodetsky, M.L. & Ilchenko, V.S. Quality-Factor and nonlinear properties of optical whispering-modes. Phys. Lett. A. 137, 393-397 (1989).

Scrifres, D. R., Streifer, W. & Burnham, R. D. Beam scanning with twins-stripe injection lasers. Appl. Phys. Lett. 33, 702-704 (1978).

Kurosaka, Y. et al. On-chip beam-steering photonic-crystal lasers. Nature Photonics 4, 447-450 (2010).

Choi, M., Tanaka, T., Fukushima, T. & Harayama, T. Control of directional emission in quasistadium microactivity laser diodes with two electrodes. Appl. Phys. Lett. 88, 211110 (2006).

Fukushima, T., Tanaka, T. & Harayama, T. Ring and axis mode switching in multielectrode strained InGaAsP multiple-quantum-well quasistadium laser diodes. Appl. Phys. Lett. 87, 191103 (2005).

Psaltis, D., Quake, S. R. & Yang, C. Developing optofluidic technology through the fusion of microfluidics and optics. Nature 442, 381-386 (2006).

Monat, C., Domachuk, P. & Eggleton, B. J. Integrated optofluidics: A new river of light, Nature Photonics 1, 106-114 (2007).

Eichler, H. J., Klein, U. & Langhans, D. Measurement of orientational relaxation times of Rhodamine 6G with a streak camera. Chem. Phys. Lett. 67, 21-23 (1979).

Johnson, S. G. et al. Low-loss asymptotically single-mode propagation in large-core Omniguide fibers. Opt. Express 9, 748-779 (2001).

Zhang, F., Aravanis, A. M., Adamantidis, A., Lecea, L. & Deisseroth, K. Circuit-breakers: otpical technologies for probing neural signals and systems. Nature Rev. Neuroscience 8, 577-581 (2007).

Ruff, Z. et al. Polymer-composite fibers for transmitting high peak power pulses at 1.55 microns. Opt. Express 18, 15697-15703 (2010).

* cited by examiner

Whispering-gallery mode

FIG. 2A    Radial mode

FIG. 7
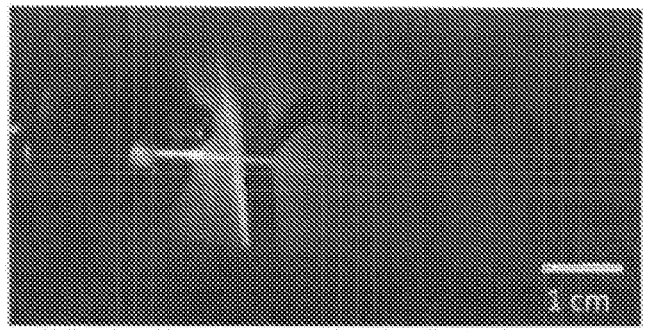
FIG. 8
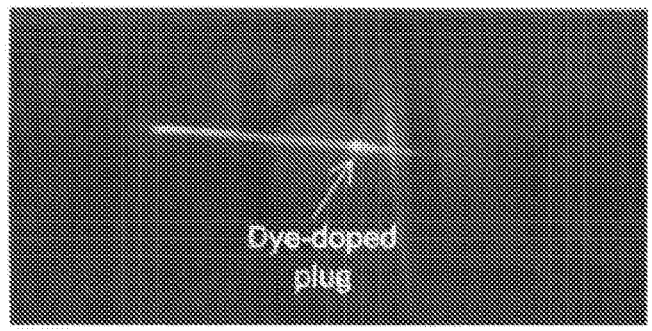
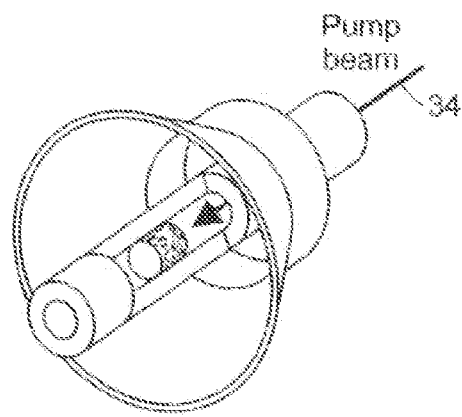
FIG. 9-1
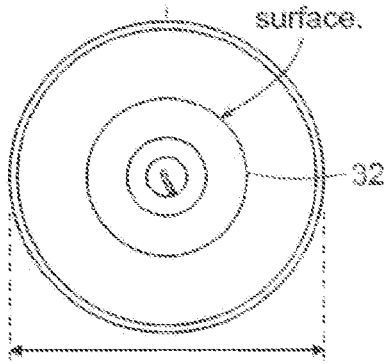
FIG. 9-2

MICROFLUIDIC RADIAL FIBER LASER UTILIZING AN EXTERNAL POLARIZER TO MODULATE ITS AZIMUTHAL INTENSITY DISTRIBUTION

This invention was made with government support under Grant No. W911NF-07-D-0004 awarded by the Army Research Office and under Grant No. DMR-0819762 awarded by the National Science Foundation. The government has certain rights in this invention.

BACKGROUND OF THE INVENTION

This invention relates to fiberoptic lasers and more particularly to control of the angular intensity distribution of light emission from a zero angular momentum radial fiber laser.

From the incandescent lamp to the modern solid state laser, the challenges associated with controlling the angular intensity distribution of light emission remain largely unresolved. While quasi-Lambertain sources form the basis for most modern displays, the lack of angular resolution presents a limitation in any future attempts to emulate light scattering events that have specific angular distributions, such as, e.g., in visual perception.

The directionality of light emitting devices is generally controlled by external mechanical and/or electronic beam steering optics. However, integrating beam manipulation capabilities directly within the light emitting structure can lead to more compact and functional light sources. On-chip control of beam directionality has been demonstrated in several laser configurations, including injection twin-stipe lasers [18], quasistadium microcavity lasers [20-21], and photonic crystal lasers [19]. The commonality in the physics used to modulate the Poynting vector distribution in references 18-21 relies on electrically varying the gain profile, which facilitates either beam steering [18], controlling the intensity ratio between multiple beams [20], or switching between one of two lasing modes [21]. The primary mechanism used to enable directional emission control in reference 21 relies on a tunable photonic crystal structure.

The emission characteristics of coherent light sources are determined by a delicate interplay between the gain medium and the cavity structure. Rotationally symmetric resonators are particularly interesting due to the possibility of omnidirectional emission in the direction perpendicular to the axis of symmetry. However, to date, all cylindrically symmetric sources rely on the excitation of whispering-gallery modes [1-6], characterized by essentially tangential wavevectors as shown in FIG. 1. The primarily azimuthally-directed arrows in FIG. 1 denote the tangential laser emission of the high angular momentum modes. The energy density plot corresponds to a high order whispering-gallery mode supported by the cylindrical structure. The polarization of this mode is indicated by the white dots overlaid on the energy density plot and black dots on the schematic. These modes are confined near the cavity boundary by total internal reflection and can only escape through diffraction losses or scattering from surface roughness. Consequently, the inherent drawbacks of these structures include limited control over the output coupling and diffraction-limited quality factors [17].

It is therefore an object of this invention to provide a cylindrical photonic bandgap (PBG) cavity that supports high-Q purely radial modes and allows full control over output coupling and the potential for scalability to small volumes without compromising the quality factor.

SUMMARY OF THE INVENTION

The microfluidic radial fiber laser according to the invention includes an optical fiber including a cavity containing a microfluidic gain medium bounded by a composite structure of alternating layers of high and low index materials forming an axially invariant, rotationally symmetrical photonic bandgap cavity. The optical fiber also includes at least one microfluidic channel containing liquid crystal modulators in the fiber cladding extending in an axial direction. A pair of electrodes flanks the microfluidic channel. An electrical potential across the pair of electrodes will rotate the liquid crystal molecules to rotate the linearly polarized state of light emitted from the cavity. An external linear polarizer is disposed around the fiber to modulate azimuthal laser intensity distribution.

In a preferred embodiment of the invention, there are a plurality of microfluidic channels surrounding the cavity. It is preferred that the microfluidic gain medium be an aqueous plug including a laser dye. A preferred embodiment further includes an electronically controlled microfluidic system to rapidly transport the dye-doped aqueous plug within the fiber core.

In another preferred embodiment, the composite structure includes alternating layers of chalcogenide glass and polycarbonate. The microfluidic system may include a set of pressure-driven, electrically actuated microdispensing valves. The aqueous plug may be introduced into the fiber along with silicone oil.

BRIEF DESCRIPTION OF THE DRAWING

FIGS. 7 and 8 are photographs of the lasing plug at different positions along the fiber according to an embodiment of the invention.

FIG. 9 is a schematic illustration of another embodiment of the invention disclosed herein.

DESCRIPTION OF THE PREFERRED EMBODIMENT

Figure 1A:
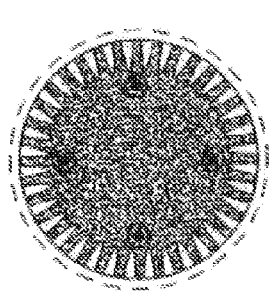
FIG. 1 is a prior art cylindrical structure supporting high-Q whispering-gallery modes.
Figure 1:
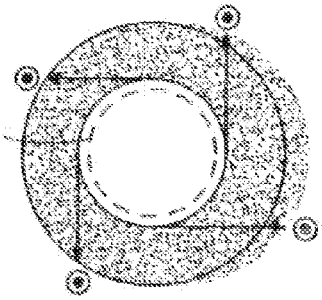
Figure 2:
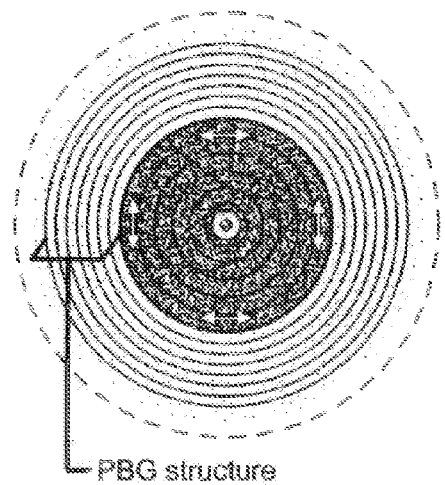
FIG. 2 is a schematic illustration of an embodiment of the radially emitting fiber laser invention disclosed herein.
Figure 2:
Figure 2:
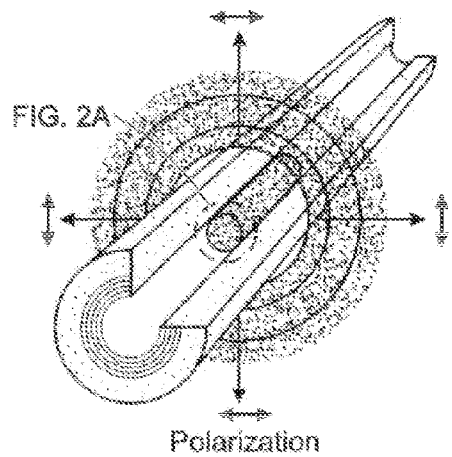

An embodiment of the invention disclosed herein is shown in FIG. 2 which shows a radially emitting fiber laser structure and energy density plot for a high-Q $TE_{0n}$ fiber laser mode.

The outgoing, radially-directed arrows denote the direction of laser emission. The white arrows overlaid on the energy density plot denote the polarization of the mode, which is also indicated in black arrows outside the cavity on the schematic of FIG. 2. The periodic PBG structure surrounding the fiber core corresponds to layers of $As_{25}S_{75}$ and polycarbonate [28].

Two important properties of this light source are the radially isotropic emission and the fixed polarization with respect to the fiber axis. These two properties form the basis for directional intensity control, opening the path towards an angularly resolved pixel. By encircling a PBG cavity with an array of LC light modulators integrated directly into the fiber cladding as will be described below, the polarization state of the wavefront can be tuned at multiple azimuthal locations, thus facilitating controlled angular intensity modulation. Previously constructed devices aimed at monolithically integrating directionality control within the light emitting structure rely on electrically varying the gain profile, making possible either beam steering [18], controlling the ratio of intensities between multiple beams [20], or switching between one of two lasing modes [21]. And more recently, directionality control of a laser beam using a tunable photonic-crystal structure has been demonstrated [19]. Here we report on a fundamentally different approach to spatially controlling the emitted field. Our approach relies on a fixed photonic bandgap structure with uniform gain, but variable, external cavity wavefront modulation. This facilitates the unique ability to both independently and simultaneously control the intensity emanating from the fiber in multiple directions within the plane of emission.

Figure 3:
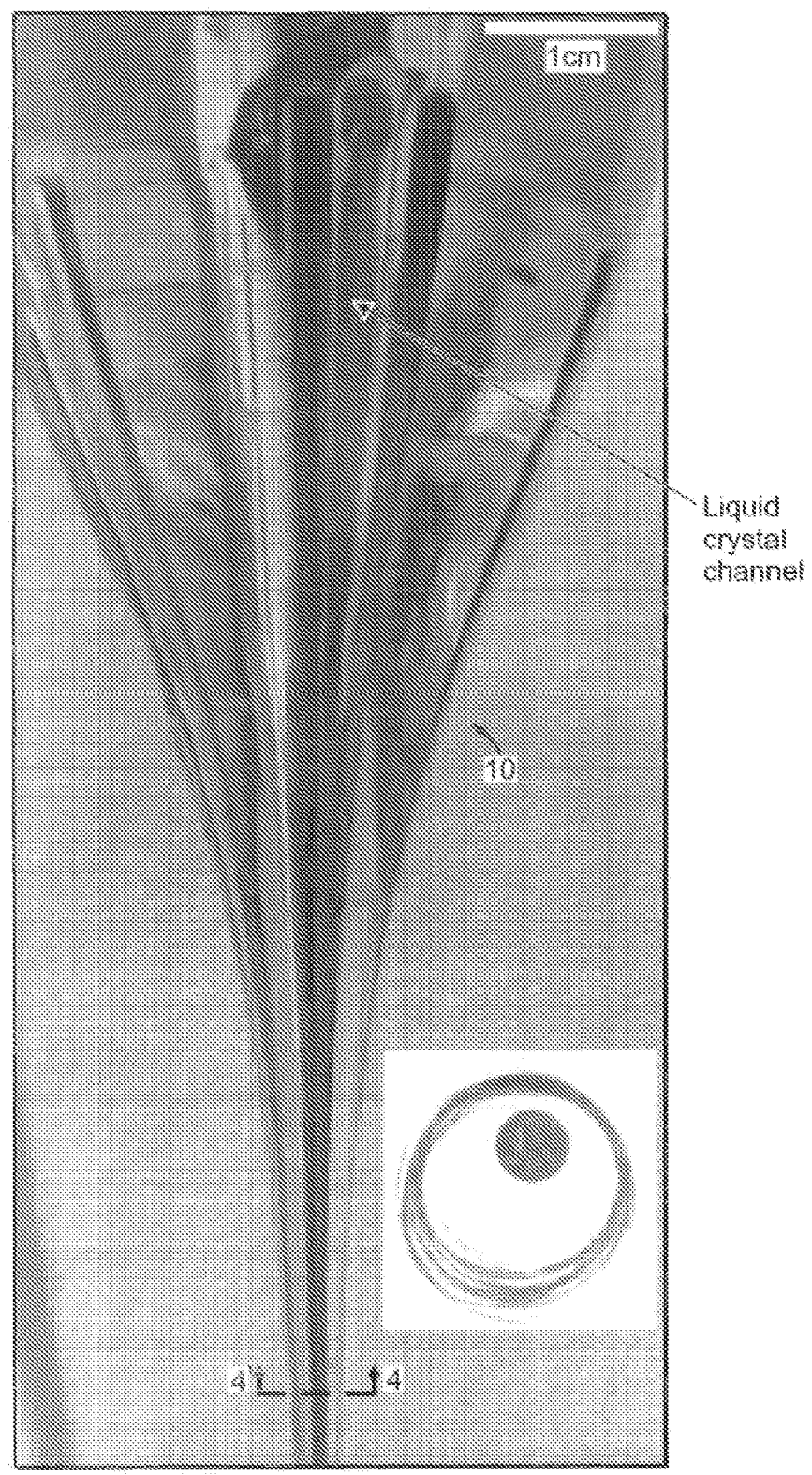
FIG. 3 is a perspective view of a drawn preform used to make the fiber laser according to one embodiment of the invention.
Figures 1, 4:
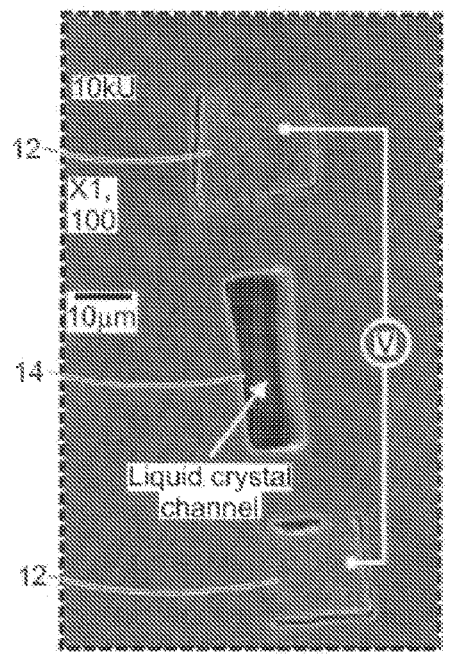
FIG. 4 includes SEM micrographs of the laser fiber structure of an embodiment of the invention.
Figures 2, 4:
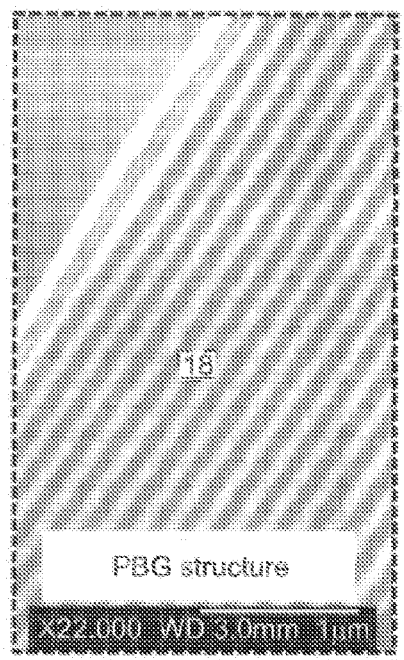
Figure 4:
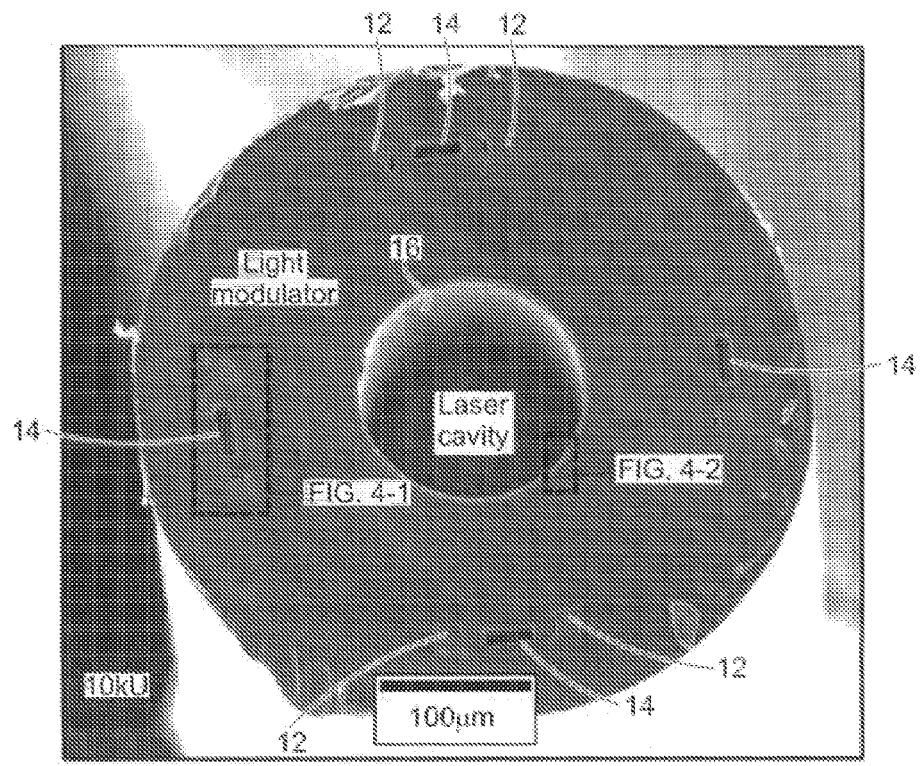

This optofluidic fiber device of the invention is achieved by a new fabrication method which enables a single fiber to host multiple, disparate, and independently electrically and optically addressable fluids. This method is based on the thermal drawing of a macroscopic preform 10 shown in FIG. 3 assembled with all the solid materials and topography of the resulting fiber. The perform 10 contains several pairs of electrodes 12 (FIG. 4) which span hollow microchannels 14 and an annular multilayered cavity 16, all of which must simultaneously scale down by a factor of ~100 during the viscous flow stage of the draw. The challenge lies in maintaining the integrity and symmetry of the multilayer structure down to the nanoscale, despite the anisotropy of the cladding introduced by the microchannels 14 and the electrodes 12, which must also preserve their preform-prescribed quadrilateral profile down to the micron-scale. The composite structure 18, containing 32 alternating layers of high index chalcogenide glass and low index polycarbonate, is drawn under a high stress regime (~400 $g/mm^2$) yielding an axially invariant, rotationally symmetric, and nanostructured PBG cavity 16 surrounded by multiple electrically addressable microfluidic channels 14 embedded in the fiber cladding.

Figure 5:
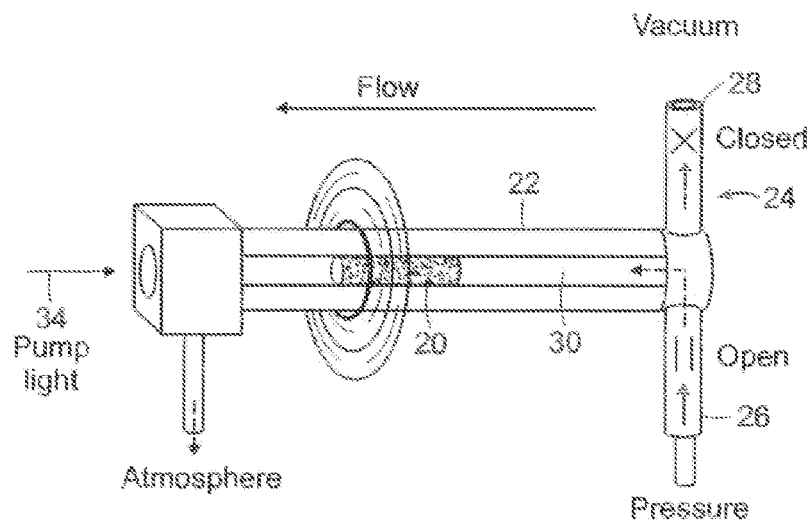
FIG. 5 is a schematic illustration of the microfluidic system used to transport the gain medium within the fiber laser disclosed herein.
Figure 6:
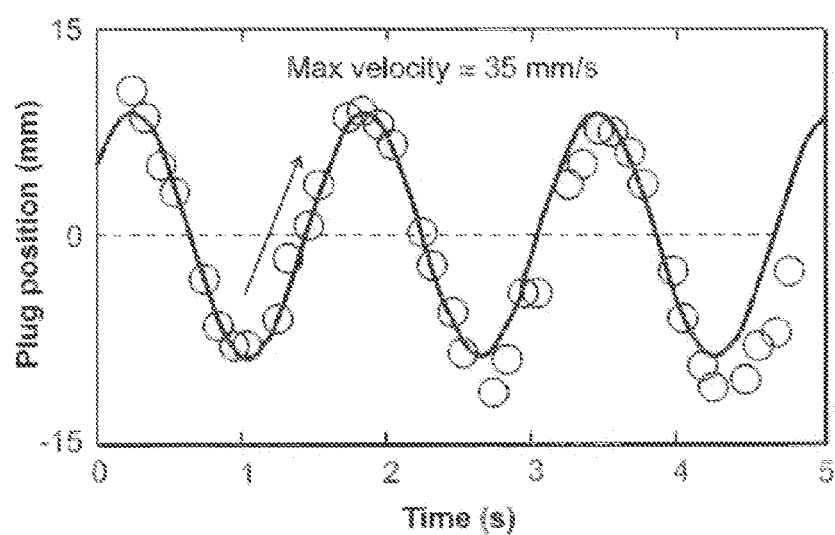
FIG. 6 is a plot of plug position versus time for gain medium motion within the fiber.

The merging of optics and microfluidics enables the exploration of optofluidic devices with dynamically tunable properties [22-23]. Here, the extended length of the PBG structure coupled with the hydrophobic nature of the chalcogenide glass surface facilitates the realization of a microfluidic laser in which surface tension plays an important role. With reference to FIG. 5, water plugs 20, which can host a variety of laser dyes forming a gain medium, are transported inside a fiber 22 without wetting the surface, giving rise to a dynamically controlled laser cavity 16 along the fiber 22 axis. An electronically controlled microfluidic system 24 is utilized to rapidly transport the dye-doped aqueous plugs 20 within the fiber 22 core. The system 24 is composed of an optical/fluidic coupler at the input facet of the fiber and a set of pressure driven, electrically actuated microdispensing valves 26 and 28 at the distal end, allowing for bidirectional flow control. As shown in FIG. 6, the dynamics of the system is recorded as the plug 20 is optically pumped and simultaneously set into an oscillating motion by alternating valves 26 and 28 actuations. Plug 20 velocities up to 35 mm/sec have been achieved. The circles indicate measured plug 20 position. Surrounding the gain medium by an incompressible immiscible fluid 30 (e.g., silicone oil) allows reproducible transport of the lasing plug 20 to any position within the fiber 22. FIGS. 7 and 8 are photographs of the lasing plug 20 at two different positions along the fiber 22.

In addition to facilitating the plug 20 movability, the fluidic nature of the host material is critical in shaping the laser beam properties. The interaction of the microfluidic gain medium with the annular resonator leads to a cylindrical wavefront emanating radially from the fiber 22, which appears as a ring-like beam 32 in the far-field (FIG. 9). The observed far-field axial 145 collimation can be rationalized by the low diffraction facilitated by the continuous translational symmetry of the laser cavity along the fiber 22 axis, and the smooth interface and uniformity of the liquid gain medium. The divergence angle is determined by the penetration depth of pump light 34 into the gain medium plug 20. This interaction length, combined with the circular cross-section of the core, defines a cylinder from which laser light is emitted. In our experiments, this length is on the order of 100 μm. Axial diffraction, which is proportional to the ratio between wavelength and the active plug length, is therefore expected to be less than ~10 mrads.

Figure 10:
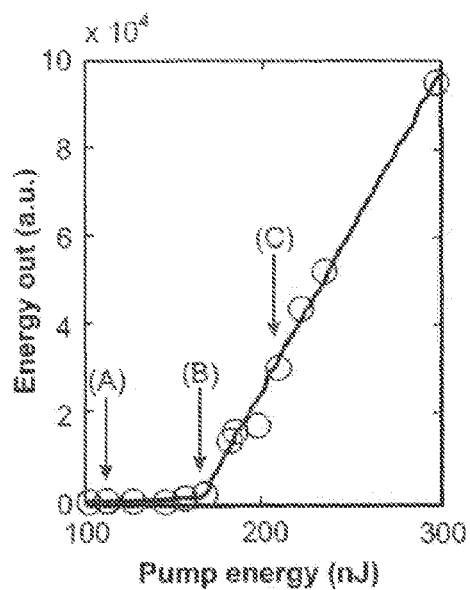
FIG. 10 is a graph of energy out versus pump energy for an embodiment of the invention.
Figure 11:
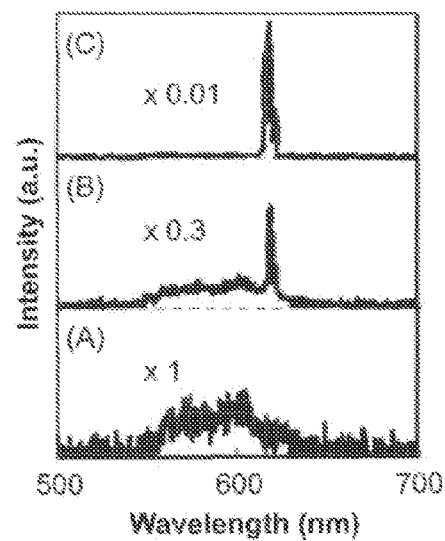
FIG. 11 includes graphs of intensity versus wavelength for light emitted according to the invention.
Figure 12:
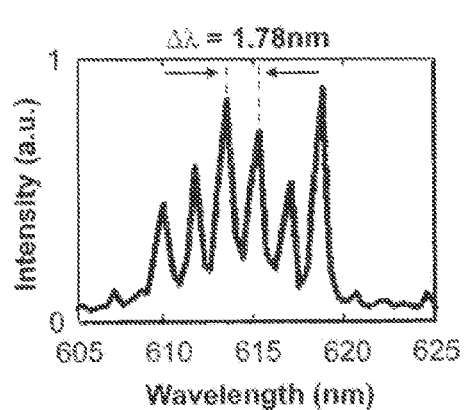
FIG. 12 is a graph of intensity versus wavelength for light emitted by an embodiment of the invention just above laser threshold.
Figure 13:
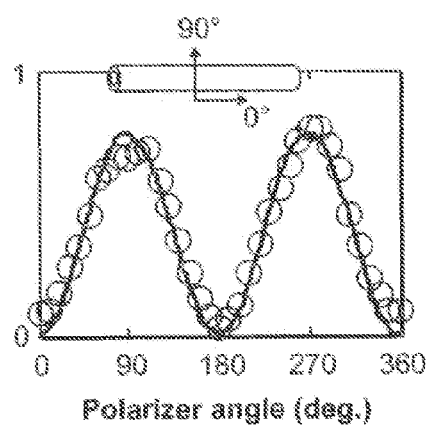
FIG. 13 is a graph showing polarization measurement of light emitted by the fiber laser obtained by rotating a linear polarizer in the plane shown by the vectors in the insert.

We explored the optical properties of the microfluidic fiber laser by infiltrating a 1 mM Rhodamine 590 (R590) doped aqueous plug 20 into the fiber core and pumping it with a linearly polarized Nd:YAG laser at 532 nm. A clear onset of lasing is observed at a pump energy of ~165 nJ as shown in FIG. 10. FIG. 11 shows spectra measured from the fiber laser below threshold (A), near threshold (B) and above threshold (C). The spacing between individual lasing peaks reveals an average separation of 1.78 nm for a fiber with an 80 μm core as shown in FIG. 12. Considering the free spectral range of the longitudinal modes in a Fabry-Perot resonator, $\Delta\lambda \sim \lambda_0^2/2nd$, where $\lambda_0$ is the central lasing wavelength, and n is the refractive index of the dye solution, a cavity length d=78 μm is calculated, which agrees well with the fiber core diameter. The polarization of the emitted light is measured by rotating a linear polarizer positioned between the fiber and a spectrometer. Below threshold, the fluorescence light is measured to be randomly polarized. However, at the onset of lasing, pure TE modes are found to emit from the PBG cavity, polarized only along the azimuthal direction as can be seen in FIG. 13.

The radial symmetry and polarization properties of the emitted light can be understood by considering the fluid properties of the gain medium host 20. Unlike the fixed spatial orientation imposed by a solid material, molecules dissolved in a liquid have rotational freedom. This rotational motion, occurring on the time scale of picoseconds [24], permits the dye molecules to physically reorient before fluorescing, which occurs on a nanosecond time scale. Therefore, unlike in solid plug dye lasers, in which the emission polarization and direction are dictated by the linear pump polarization and are hence anisotropic [10], here the fluorescence is independent of the pump polarization and emits isotropically. This emission couples to the fiber cavity modes, of which the TE polarized have the lowest losses [25] and therefore are expected to reach threshold first.

We can use this intrinsic radial emission and azimuthal polarization state to achieve controlled directional emission. Thus far the hollow microchannels 14 (FIG. 4) have been empty. But now, we can exploit them by infiltrating them with LCs in order to create a novel hybrid fiber device capable of modulating the coherent laser emission as a function of angle. This is enabled by the synergy of these LC devices integrated at micron scale separation within one fiber. The linearly polarized annular wavefront escaping the PBG cavity 16 can simultaneously interact with the multiple LC cells 14 surrounding it, each of which can be independently controlled. We find that LCs can infiltrate the microchannels 14 through capillary action for tens of centimeters resulting with the LC director aligned parallel to the channel axis. Supplying a potential difference to the pair of electrodes 12 spanning an LC infiltrated microchannel 14 generates an electric field perpendicular to the LC director. Above a threshold voltage, the applied field produces a torque on the LC molecules that leads to their rotation [26]. The optical anisotropy of LC molecules together with the control on their spatial orientation provides a mechanism to continuously rotate the linearly polarized state of the laser light passing through each microchannel 14. Fixing a thin external linear polarizer 40 (FIG. 14a) around the fiber, this mechanism is used to modulate the azimuthal laser intensity distribution. We note that although a whispering-gallery-like emission with a precise polarization state could also in principle be modulated by an annular array of LC channels, the non-radial nature of this emission in the vicinity of the cavity would pose significant practical challenges to enable this oblique transmission to be efficiently modulated.

Figure 14A:
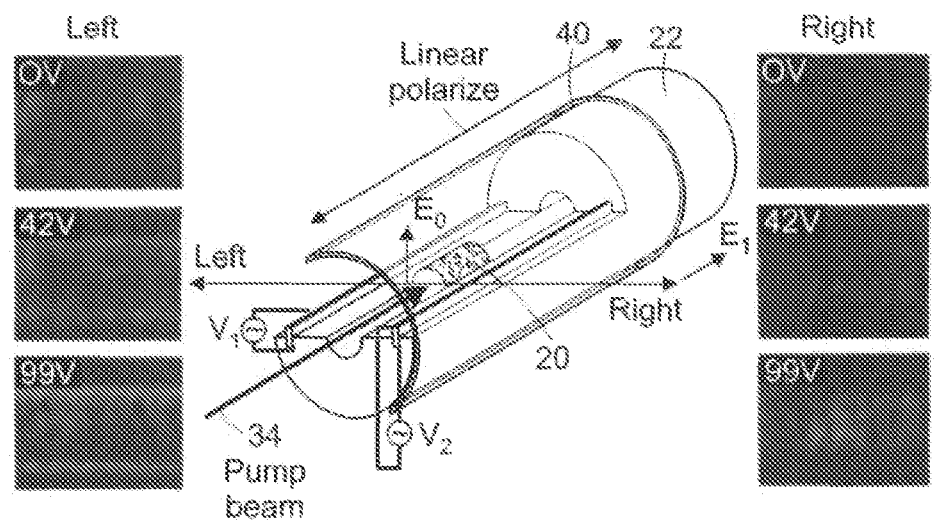
FIG. 14a is a perspective view of a preferred embodiment of the invention disclosed herein with oppositely facing LC-filled microchannels.
Figure 14B:
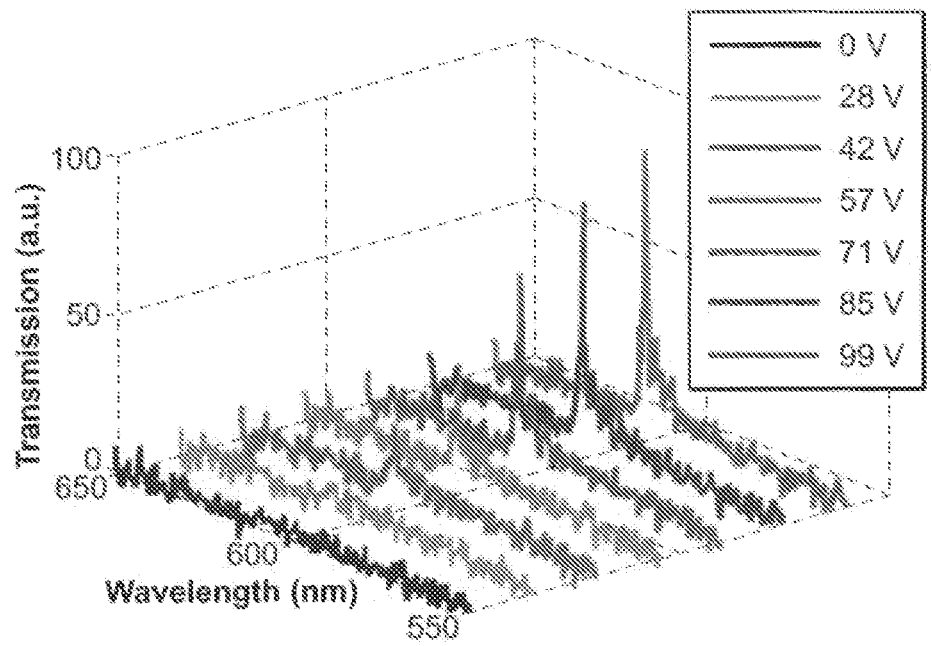
FIG. 14b shows a series of graphs of transmission versus wavelength for light transmitted through an LC-filled microchannel and linear polarizer at various applied voltages.

We demonstrated the invention by contacting two opposing sets of LC devices. This allowed for simultaneous and independent tuning of the light intensity emitted from opposite sides of the same fiber (FIG. 14a). A R590-doped aqueous plug 20 was positioned in the core of the fiber 22 and pumped as described previously. The thin polarizer sheet 40 was wrapped around the fiber 22 with its transmission axis aligned along the fiber axis such that the emitted light was blocked in the absence of an applied electric field or below the threshold voltage. Above the threshold voltage, independent intensity modulation emanating from either side of the fiber 22 was clearly visible in the micrographs in FIG. 14a and was further substantiated by measuring the laser spectra as a function of driving voltage (FIG. 14b). Both measurements revealed a maximum extinction ratio of ~9 dB. The azimuhal resolution was ~11°.

Methods:

Fiber Fabrication.

A bilayer film used as the base for the multilayer PBG structure was fabricated by thermal evaporation of $As_{25}S_{75}$ onto both sides of a 10 μm thick polycarbonate (Lexan) film. This film was subsequently rolled onto a Teflon lined mandrel and additional thicker PC films were added to increase the outer diameter to ~30 mm, after which this preform was consolidated under vacuum at ~190° C. until the individual layers fused together into one solid part. After consolidation, groups of three channels with prescribed dimensions were machined along the length of the preform. The two outer channels were filled with solid carbon-loaded polyethylene (CPE) strips while the center groove was left empty. Additional polymer films were rolled around the preform to a ~40 mm diameter and a second consolidation step ensued. During the subsequent thermal drawing process, the preform was scaled down by a factor of ~100, resulting in the vacant cavities being pulled into hollow microscopic channels, the CPE strips drawn into the continuous electrodes 12 (FIG. 4) which are contacted post draw, and the multilayered glass/polymer microstructure 18 drawn into a nanostructured optical cavity lining the inner core 16 of the fiber.

Laser characterization, Rhodamine 590 (Exciton) dissolved in DI water at 1 mM concentration was infiltrated into the fiber core with a syringe. The pump beam from the second harmonic (532 nm) of the linearly polarized Nd:YAG laser (Continuum Minilite II) with a nominal pulse duration of 9 ns and 10 Hz repetition rate was coupled into the fiber core through a 10 cm focal length lens. A small fraction of the pump beam was diverted with a beam splitter to monitor the input pump energy using a laser energy meter (Molectron EPM 1000 with the J4-09 probe). A 10× objective lens was used to collect a fraction of the light emitted radially from the fiber and focused directly onto the entrance slit of a spectrometer (Ocean Optics USB4000-UV-VIS).

Microfluidic Controls.

Bidirectional pumping of fluid into and out of the fiber was achieved by alternating the electrical actuation of the microdispensing valves 26 and 28 (Lee Company VHS M/2) connected to pressurized and depressurized oil reservoirs. Depressurization was achieved using a standard Venturi-based vacuum generator.

Intensity Modulation Using LCs.

MLC-2058 (Merck) was infiltrated into the microchannels by capillary forces. A function generator (Stanford Research Systems DS345) operated at a sinusoidal 100 Hz was used to drive a high voltage amplifier (A. A. Lab Systems A-301) which was connected to the electrodes. A 10× objective lens was used to image each microchannel to a CCD camera (Motic Moticam 1000) and a series of images were recorded as the voltage was changed. The CCD was replaced with a fiber coupled spectrometer to measure the laser spectra.

The precise control afforded by the present invention over the direction of illumination from the surface of a thin and flexible fiber presents numerous opportunities, especially when combined with the capacity to also tune the position of the light source along a given axis. Due to the minimally invasive means by which light can be administered using fibers, new possibilities can emerge in medical fields such as photodynamic therapy [16] and optogenetics [27]. Moreover, the ability to integrate a polarized omnidirectional light source with a cylindrical array of LC modulators within fibers paves the way towards light emitting textiles and displays with angularly resolved pixels. Additionally, the possibility of simultaneously incorporating a coherent light source, multiple electrically addressable microfluidic channels, as well as light sensitive layers [14-15] into a single fiber sets the stage for lab-in-a-fiber chemical and biological analysis systems.

The numbers in brackets refer to the references listed herein. The contents of all of these references are incorporated herein by reference.

It is recognized that modifications and variations of the invention described herein will be apparent to those of skill in the art and it is intended that all such modifications and variations be included within the scope of the appended claims.

REFERENCES

[1] McCall, S. L., Levi, A. F. J., Slusher, R. E., Pearton, S. J. & Logan, R. A. Whispering-gallery mode microdisk lasers. *Appl. Phys. Lett.* 60, 289-291 (1992).

[2] Moon, H.-J., Chough, Y.-T. & Kyungwon A. Cylindrical microcavity laser based on the evanescent-wave-coupled gain. *Phys. Rev. Lett.* 85, 3161-3164 (2002).

[3] Kawabe, Y. et al. Whispering-gallery-mode microring laser using a conjugated polymer. *Appl. Phys. Lett.* 72, 141-143 (1998).
[4] Knight, J. C., Driver, H. S. T., Hutcheon, R. J. & Robertson, G. N. Core-resonance capillary-fiber whispering-gallery-mode laser. *Opt. Lett.* 17, 1280-1282 (1992).
[5] Malko, A. V. et al. From amplified spontaneous emission to microring lasing using nanocrystal quantum dot solids. *Appl. Phys. Lett.* 81, 1303-1305 (2002).
[6] Kazes, M., Lewis, D. Y., Ebenstein, Y., Mokari, T. & Banin, U. Lasing from Semiconductor Quantum Rods in a Cylindrical Microcavity. *Adv. Mater.* 14, 317-321 (2002).
[7] O'Connor. B., Pipe, K. P. & Shtein, M. Fiber based organic photovoltaic devices, *Appl. Phys. Lett.* 92, 193306 (2008).
[8] Fokine, M. et al. Integrated fiber Mach-Zehnder interferometer for electro-optic switching. *Opt. Lett.* 27, 1643-1645 (2007).
[9] Lee, M. R. et al. Solar power wires based on organic photovoltaic materials. *Science* 324, 232-235 (2009).
[10] Shapira, O. et al. Surface-emitting fiber lasers. *Opt. Express* 14, 3929-3935 (2006).
[11] Danto. S. et al. Fiber Field-Effect Device Via In Situ Channel Crystallization. *Adv. Mater.* 22, 4162-4166 (2010).
[12] Orf, N. D. et al. Fiber draw synthesis. *PNAS* 108, 4743-4747 (2011).
[13] Egusa, S. et al. Multimaterial Piezoelectric fibres. *Nature Materials* 9, 643-648 (2010).
[14] Abouraddy, A. F. et al. Towards multimaterial multifunctional fibres that see, hear, sense and communicate. *Nature Materials* 6, 336-347 (2007).
[15] Sorin, F. et al. Exploiting Collective Effects of Multiple Optoelectronic Devices Integrated in a Single Fiber. *Nano Lett.* 9, 2630-2635 (2009). [16] Dolmans, D. E., Fukumura, D. & Jain, R. K. Photodynamic therapy for cancer. *Nature Rev. Cancer* 3, 380-387 (2003).
[17] Braginsky, V. B., Gorodetsky, M. L. & Ilchenko, V. S. Quality-Factor and nonlinear properties of optical whispering-modes. *Phys. Lett. A*. 137, 393-397 (1989).
[18] Scifres, D. R., Streifer, W. & Burnham, R. D. Beam scanning with twin-stripe injection lasers. *Appl. Phys. Lett.* 33, 702-704 (1978). [19] Kurosaka, Y. et al. On-chip beam-steering photonic-crystal lasers. *Nature Photonics* 4, 447-450 (2010).
[20] Choi, M., Tanaka, T., Fukushima, T. & Harayama, T. Control of directional emission in quasistadium microcavity laser diodes with two electrodes. *Appl. Phys. Lett.* 88, 211110 (2006).
[21] Fukushima, T., Tanaka, T. & Harayama, T. Ring and axis mode switching in multielectrode strained InGaAsP multiple-quantum-well quasistadium laser diodes. *Appl. Phys. Lett.* 87, 191.103 (2005).
[22] Psaltis, D., Quake, S. R. & Yang, C. Developing optofluidic technology through the fusion of microfluidics and optics. *Nature* 442, 381-386 (2006).
[23] Monat, C., Domachuk, P. & Eggleton, B. J. Integrated optofluidics: A new river of light, *Nature Photonics* 1, 106-114 (2007).
[24] Eichler, H. J., Klein, U. & Langhans, D. Measurement of orientational relaxation times of Rhodamine 6G with a streak camera. *Chem. Phys. Lett.* 67, 21-23 (1979).
[25] Johnson, S. G. et al. Low-loss asymptotically single-mode propagation in large-core Omniguide fibers. *Opt. Express* 9, 748-779 (2001).
[26] Yeh, P. & Gu, C. *Optics of liquid crystal displays, second ed.* (John Wiley & Sons, Inc., Hoboken, N.J., 2010).
[27] Zhang, F., Aravanis, A. M., Adamantidis, A., Lecea, L. & Deisseroth, K. Circuit-breakers: optical technologies for probing neural signals and systems. *Nature Rev. Neuroscience* 8, 577-581 (2007).
[28] Ruff, Z. et al. Polymer-composite fibers for transmitting high peak power pulses at 1.55 microns. *Opt. Express* 18, 15697-15703 (2010).

What is claimed is:

1. Microfluidic radial fiber laser comprising:
an optical fiber including a cavity containing a microfluidic gain medium bounded by a composite structure of alternating layers of high and low index materials forming an axially invariant, rotationally symmetrical photonic handgap cavity, the optical fiber also including at least one microfluidic channel containing liquid crystal modulators in the fiber cladding extending in an axial direction and a pair of electrodes flanking the microfluidic channel, whereby an electrical potential across the pair of electrodes will rotate the liquid crystal molecules to rotate the linearly polarized state of light emitted from the cavity; and
an external linear polarizer disposed around the fiber to modulate azimuthal laser intensity distribution.

2. The laser of claim 1 further including a plurality of microfluidic channels surrounding the cavity.

3. The laser of claim 1 wherein the microfluidic gain medium is an aqueous plug including a laser dye.

4. The laser of claim 1 further including an electronically controlled microfluidic system to rapidly transport dye-doped aqueous plugs within the fiber core.

5. The laser of claim 4 wherein the microfluidic system includes a set of pressure-driven, electrically actuated micro-dispensing valves.

6. The laser of claim 3 wherein the aqueous plug is included along with silicone oil.

7. The laser of claim 1 wherein the composite structure includes alternating layers of chalcogenide glass and polycarbonate.

8. The laser of claim 7 wherein the chalcogenide glass comprises $As_{25}S_{75}$.

* * * * *